(No Model.) 3 Sheets—Sheet 1.

H. HUDSON & M. TOBEY.
MACHINE FOR BREAKING WHEAT.

No. 315,143. Patented Apr. 7, 1885.

Witnesses,
Geo. H. Strong
J. L. Rouse

Inventors,
Harry Hudson
Miles Tobey
By Dewey & Co.
Attorneys (No Model.) 3 Sheets—Sheet 3.
H. HUDSON & M. TOBEY.
MACHINE FOR BREAKING WHEAT.
No. 315,143. Patented Apr. 7, 1885.

Witnesses,
Geo. H. Strong.

Inventor,
Harry Hudson
Mills Tobey
By Dewey & Co.
Attorneys

UNITED STATES PATENT OFFICE.

HARRY HUDSON AND MILES TOBEY, OF SALINAS, CALIFORNIA.

MACHINE FOR BREAKING WHEAT.

SPECIFICATION forming part of Letters Patent No. 315,143, dated April 7, 1885.

Application filed June 2, 1884. (No model.)

*To all whom it may concern:*

Be it known that we, HARRY HUDSON and MILES TOBEY, of Salinas city, county of Monterey, and State of California, have invented an Improvement in Machines for Breaking Wheat; and we hereby declare the following to be a full, clear, and exact description thereof.

Our invention relates to the class of machines for breaking wheat, preparatory to crushing or grinding it to flour, and the object of which is to remove from the grains what is known as the "crease-dust," which is in the seams.

The object of our invention is to break the wheat clean and sharp, whereby the crease-dust, a portion of the outer hull or bran, and the germs are separated, and to expel the grain from the machine as soon as broken, whereby it is not liable to be too much broken and little or no break-flour is made, as is the case with the machines at present in use for this purpose.

Our machine comprises a rotating disk having upon its rim a narrow annular band of teeth, a central feed-vessel with intervening feeders on its surface, adapted to feed the wheat from the central vessel to the teeth, a stationary annular vessel or cylinder placed above the rotating disk, and having a notched or corrugated surface on its bottom rim, between which and the teeth the grain is caught and broken, and an encircling band or hoop guarding the apertures formed by said notched surface, to prevent the grain from discharging directly, and to cause it to fall between the teeth, all of which we shall hereinafter fully describe, claim, and explain, by reference to the accompanying drawings, in which—

Figure 1:
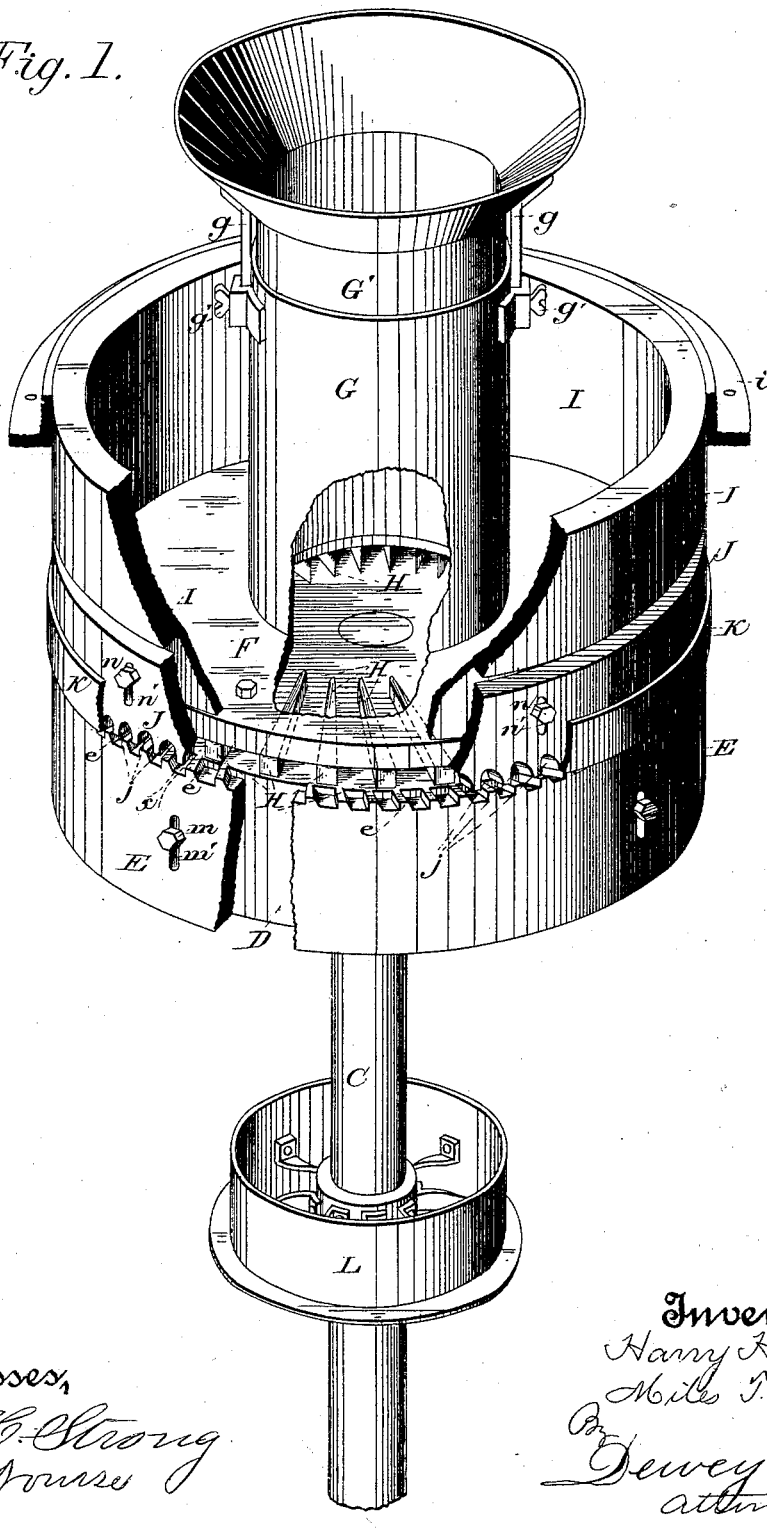
Figure 2:
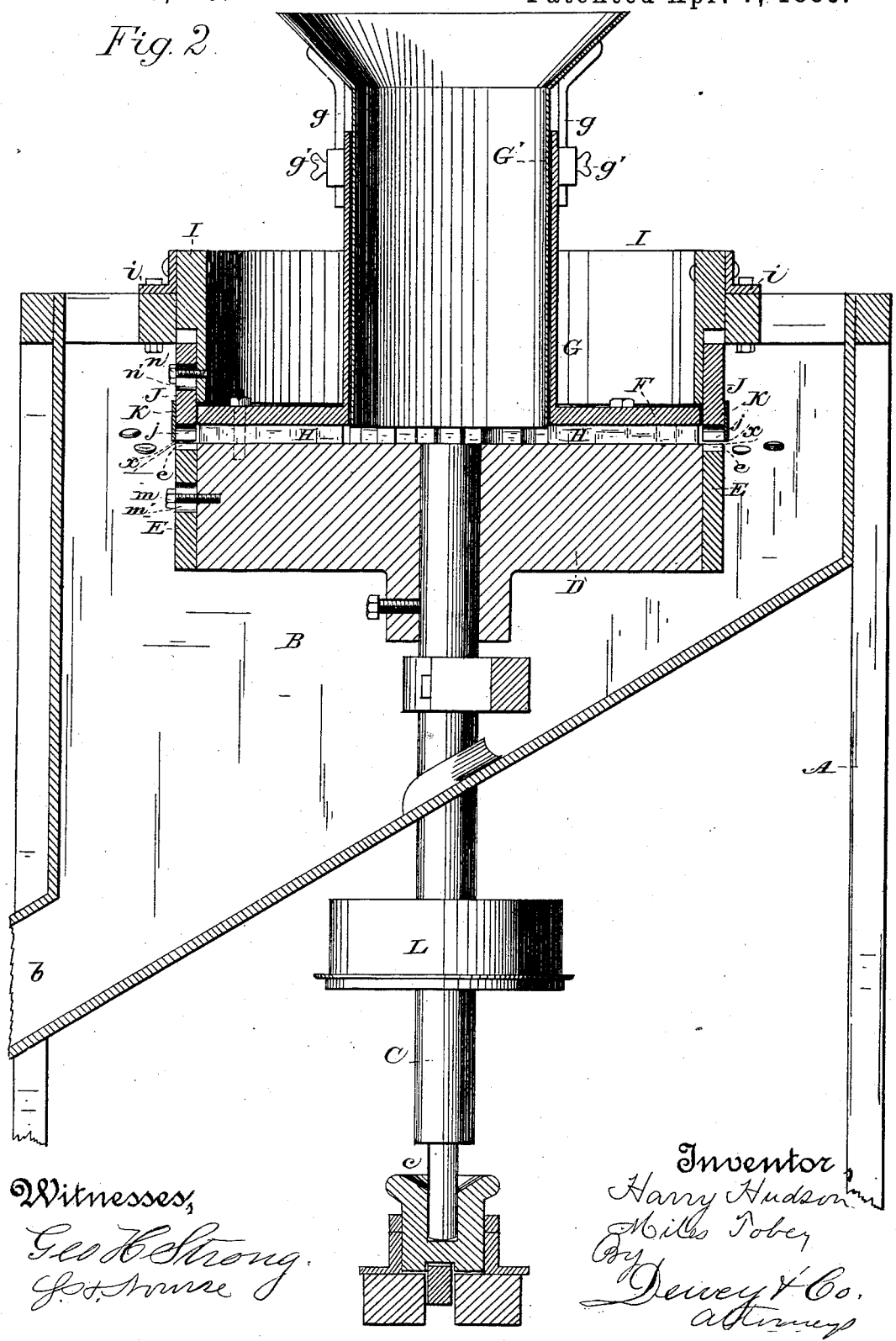
Figure 3:
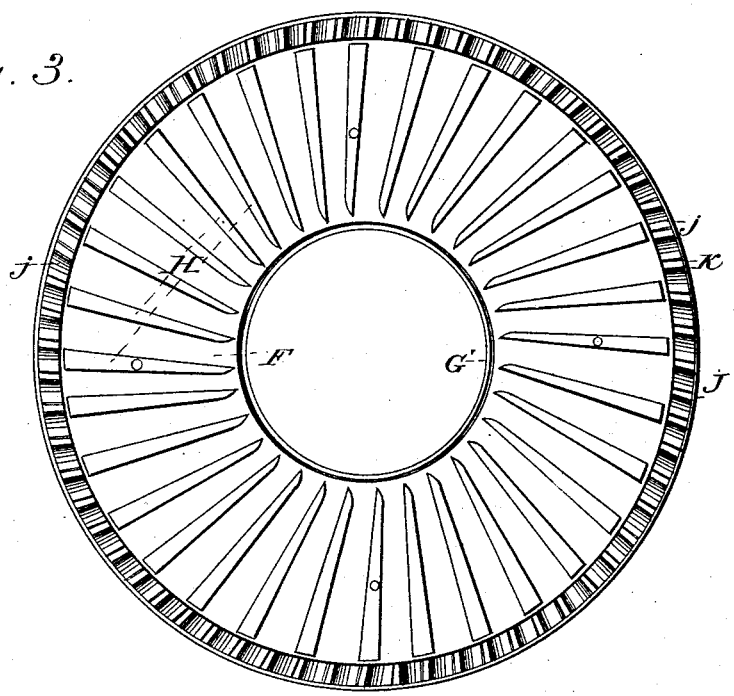
Figure 4:
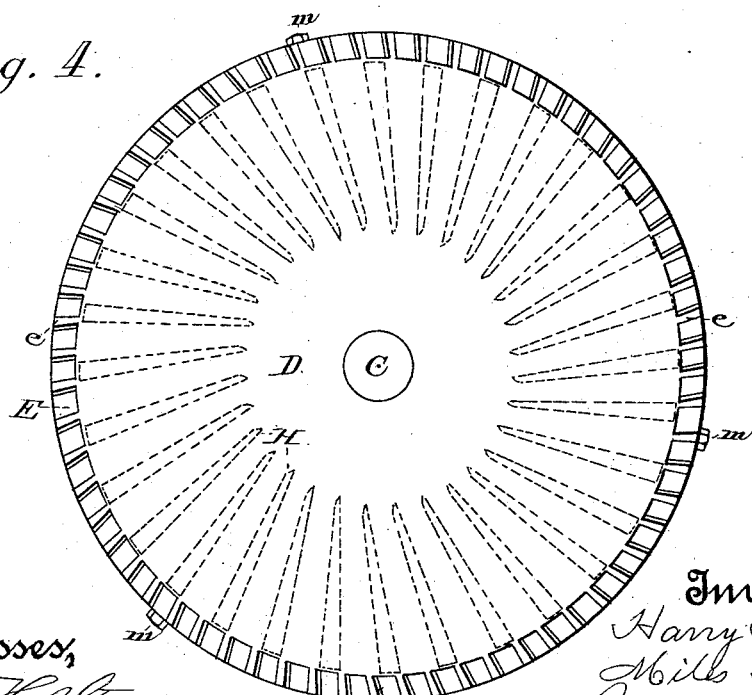

Figure 1 is a perspective view of our machine for breaking wheat, various portions being broken away in order to show the interior mechanism, and the discharge-hopper removed. Fig. 2 is a vertical section of the same. Fig. 3 is a plan looking up at the annular cap-plate F and the feed-ribs H, and showing the corrugations of the band J. Fig. 4 is a plan of the disk D, and showing the teeth e of the steel band E.

A is a frame, in which is a hopper, B, having an inclined bottom and a discharge-spout, b. C is a vertical shaft, stepped below in a bearing, c, and adapted to be vertically adjusted in a manner common to various machines, and which we need not herein explain. This shaft extends upward through the bottom of the hopper B, and has fixed to its top the disk D, preferably made of iron. Around its periphery is secured a thin steel band, E, the upper rim of which has the teeth e, the spaces between which are about the depth of half the thickness of a grain of wheat, and the tops of said teeth are flush with the surface of the disk. These teeth are not in a radial line, but are inclined or tangential with respect to the periphery of the disk, to provide for a proper draft in the delivery.

Secured to the disk and separated from it by a small space is an annular cap-plate, F, having a diameter about the same as that of disk D, and having rising from its open center a circular feed-vessel, G, which has an open bottom communicating directly with the surface of disk D.

In the space by which the disk and cap-plate are separated are ribs H, arranged tangentially as in the case of mill-stones and other rotating disks where a centrifugal draft is desired. These ribs, or "feeders," as we call them, extend from the circular plane of the feed-vessel G to the rim of the disk D, and are sufficiently separated to leave passages between them, the outer ends of which communicate with the spaces between the teeth e.

I is an annular bottomless vessel or cylinder secured by arms i to the frame A, Fig. 2. This cylinder fits around the feed-vessel G, and its rim rests just above, though without touching the rim of cap-plate F. To the periphery of this cylinder is secured an annular band, J, the bottom of which is notched or corrugated to form apertures j. The bottom of the band is just above the tops of teeth e, but does not touch them. The band J is of about the same thickness as the band E, so that its apertures j are in the same vertical plane as the teeth e. Around the lower portion of the outer surface of band J is a guard band or hoop, K, covering the apertures j, and extending down flush with the bottom of the band J.

Within the feed-vessel G is a funnel, G', having a flaring top. This funnel extends down to or through the open center of the cap-plate, and is adapted to be vertically adjusted in any suitable manner, as by the arms g, set by screws g'. When the funnel is lowered to touch the surface of disk D, the feed is completely shut off, and when raised to the cap-plate the feed is the greatest. Between these limits the feed may be regulated in amount as may be desirable.

The operation of the machine as far as described is as follows: A rotary motion is imparted to disk D and its cap-plate F by means of suitable power applied to a pulley, L, on shaft C, and the said shaft is raised and set in such position that the teeth e approach toward and are separated from the bottom of band J by but a small distance. (Shown in Fig. 2 by the space x.)

As before stated, the cap-plate F does not touch the bottom of the cylinder I, so that the rotation may be unimpeded by friction. The whole wheat, after being cleaned as much as possible, is fed into funnel G', through which it passes downward upon the center of the surface of disk D, the amount so passing being regulated, as previously described, by the vertical adjustment of the funnel. The wheat thence passes outward by centrifugal force (augmented by the draft occasioned by the inclination of the feed-ribs H) through the passages between said ribs to the rim of the disk. It then passes into the apertures j in band J, and being prevented from escaping directly outward by reason of the guard-hoop K, it falls down into the spaces between the teeth e. These, rotating, catch the grains between themselves and the corrugated bottom of band J, and cut or break them. This cutting or breaking is done because the hollows between the teeth e are about one-half as deep as the grain is thick, and the upper portion of the grain extending above the teeth is caught by the band J above and cut or broken off. It will be observed that this breaking is done on the outer rim of the machine, and consequently the broken grain is immediately discharged. Unbroken, it cannot be discharged, because of the guard-hoop K; but when broken it is small enough to pass outward and escape from the interstices of teeth e. These teeth have a length about equal to that of a grain of wheat, and consequently can break but one at a time, and must immediately discharge it. The tangential inclination of the teeth produces the proper draft to assist the centrifugal force in discharging the broken grains.

By reason of the immediate discharge the grains are not too much broken, as is the case with those machines in which the breaking takes place right from the start and over a wide surface, and therefore in our machine little or no break-flour is made. The broken grain falls into hopper B and is discharged. There are two adjustments, which we wish now to point out, by which provision is made for the wear of the machine. The steel band E is fixed to disk D by means of screws m, passing through elongated vertical slots m', made in the band. By loosening the screws the band may be vertically adjusted as the teeth e wear, or by removing the screws the band may be removed entirely and a new one substituted. The band J is likewise and for the same purpose rendered adjustable by means of the screws n and slots n'. The tendency of the centrifugal force acting through the feeders is to throw the grain out to the teeth endwise, and most of them drop between the teeth in a longitudinal position, whereby they are cut or broken on the seam-line, thus freeing the crease-dust, &c.

Having thus described our invention, what we claim as new, and desire to secure by Letters Patent, is—

1. In a machine for breaking wheat, the combination of a rotating disk having a narrow annular band of teeth on its outer rim, a stationary band or cylinder placed above the teeth, and having on its under rim a series of apertures communicating with the teeth and the spaces between them, and a band or hoop encircling the cylinder on its outer surface and covering the outer sides of the apertures to prevent the wheat from being discharged outwardly through said apertures, substantially as herein described.

2. In a machine for breaking wheat, a rotating disk having on its rim a series of teeth the tops of which are on a level with the surface of the disk, said teeth being arranged tangentially to the periphery of the disk, in combination with a stationary band or cylinder placed above the teeth and having a corrugated or notched surface on its bottom rim, between which and the underlying teeth the grain is caught and broken, and a guard-hoop on the outer surface of the cylinder covering the outer sides of the apertures formed by the corrugated rim of the cylinder, to prevent the grain from discharging directly through said apertures and force it to fall down between the teeth and discharge therefrom, substantially as herein described.

3. In a machine for breaking wheat, the rotating disk D, having the encircling-band E, with the series of teeth e, the tops of which are on a line with the surface of the disk, in combination with the overlying cylinder I, having the encircling-band J, the bottom rim of which is corrugated or notched to form a series of apertures, j, over the teeth and communicating therewith, and the guard-hoop K on the band J covering said apertures, all arranged substantially as and for the purpose herein described.

4. In a machine for breaking wheat, the rotating disk D, having the vertically adjustable and removable encircling-band E, with the teeth e, in combination with an overlying stationary band or cylinder having on its bottom rim a notched or corrugated surface over the teeth e, substantially as herein described.

5. In a machine for breaking wheat, a rotating disk provided with an annular series of teeth on its rim, in combination with the stationary overlying cylinder I, having the vertically adjustable and removable encircling-band J, the bottom rim of which is over the teeth and is corrugated or notched, substantially as herein described.

6. In a machine for breaking wheat, the rotating disk D, having the encircling-band E, with the teeth e, the tops of which are on a level with the surface of the disk, the annular cap-plate F, secured to the disk, and the ribs or feeders H, between the cap-plate and the disk, whereby the grain is carried outwardly to the teeth, in combination with the stationary cylinder I, having the encircling-band J, with a notched or corrugated under rim over the teeth, and the guard-hoop K, encircling the band J and covering the apertures formed by the notched surface, substantially as herein described.

7. In a machine for breaking wheat, the rotating disk D, having the encircling-band E, with teeth e, the annular cap-plate F, secured to the disk, the bottomless feed-vessel G, secured to the center of the cap-plate and communicating with the disk, and the ribs or feeders H, between the cap-plate and disk adapted to receive and carry the grain from the feed-vessel to the teeth, in combination with the stationary cylinder I, having the encircling-band J, with a notched or corrugated under rim over the teeth, and the guard-hoop K, encircling the band J and covering the apertures formed by the notched surface, substantially as herein described.

In witness whereof we have hereunto set our hands.

HARRY HUDSON.
MILES TOBEY.

Witnesses:
S. H. NOURSE,
H. C. LEE.